United States Patent [19]

Narimatsu et al.

[11] 3,916,296

[45] Oct. 28, 1975

[54] DISTORTION ANALYZER WITH AUTOMATIC TUNING CIRCUIT

[75] Inventors: Yoh Narimatsu, Sunnyvale, Calif.; Shiro Kito, Tokyo, Japan

[73] Assignee: Yokogawa-Hewlett-Packard, Ltd., Tokyo, Japan

[22] Filed: Dec. 16, 1974

[21] Appl. No.: 532,805

[30] Foreign Application Priority Data

Dec. 21, 1973 Japan .............................. 49-1451

[52] U.S. Cl. .................. 323/64; 323/75 K; 323/101; 323/123; 324/83 FE

[51] Int. Cl.$^{2}$ ...................... G01R 17/00; G05F 1/00

[58] Field of Search .............. 323/75 K, 74, 64, 101, 323/121, 122, 128; 324/83 R, 83 A, 83 Q, 83 FE

[56] References Cited

UNITED STATES PATENTS

| | | | |
|---|---|---|---|
| 2,972,890 | 2/1961 | Bergmann et al. | 324/83 Q |
| 2,986,696 | 5/1961 | Seay | 323/122 X |
| 3,315,153 | 4/1967 | Whatley | 323/75 K |
| 3,667,031 | 5/1972 | Cox, Jr. et al. | 323/101 |

*Primary Examiner*—Gerald Goldberg
*Attorney, Agent, or Firm*—A. C. Smith

[57] ABSTRACT

An apparatus utilizing a parallel-T circuit bridge achieves improved low distortion measurements. To tune the bridge, two of the bridge components that do not interact with each other in the vicinity of the frequency to which the circuit is being tuned, are made variable. By adjusting these components, the bridge is easily adjustable without a large number of adjustments and readjustments. Since there is little interaction between these components, this circuit configuration is easily adaptable to automatic tuning.

10 Claims, 6 Drawing Figures

DISTORTION ANALYZER WITH AUTOMATIC TUNING CIRCUIT

BACKGROUND OF THE INVENTION

This invention relates to a Distortion Analyzer which has an automatically-tuned fundamental rejection circuit utilizing a parallel-T circuit bridge. The present invention provides a Distortion Analyzer in which the parallel-T circuit is automatically tuned by feedback circuits that are sensitive to the input signal phase-shifted by +45° or −45°. A high sensitivity or high resolution Distortion Analyzer is realized by this invention, while the conventional Wien-bridge fundamental rejection circuit has greater internal distortion and noise at the same level of resolution or sensitivity.

Traditionally, Distortion Analayzers have a filter circuit which rejects the fundamental from the input signal, and harmonics are compared to the input signal to determine the harmonic distortion. The Distortion Analyzer which has a self-balancing bridge circuit (usually Wien-bridge circuit) is well known. Distortion Analyzers of this type are disclosed in the literature (see, for example, Japanese Pat. No. 13349/64 and U.S. Pat. No. 3,315,153).

In this self-balancing Distortion Analyzer, in-phase and orthogonal components from the fundamental of the input signal are phase detected and branch circuits of the bridge are individually adjusted by this phase detected error signal to balance the bridge. For the very low distortion measurements in the vicinity of 0.01 percent distortion, the Wien-bridge type Distortion Analyzer has the following disadvantages:

a. The Wien-bridge circuit configuration has an inherent gain loss of approximately −10 dB of the harmonic components of the input signal, thus degrading the signal-to-noise ratio.

b. The output of the Wien-bridge circuit should be followed by a very low distortion differential amplifier which has high level common-mode signal (0.3V is typical) to minimize the internal distortion.

SUMMARY OF THE INVENTION

In accordance with the preferred embodiment, the present invention includes a parallel-T circuit bridge that is tuned by adjusting two variable elements, typically a resistor in one branch of the circuit and a capacitor in a second branch of the circuit.

Furthermore, this invention provides automatic balancing in which a pair of branch circuits are individually adjusted by separate feedback circuits that utilize either a +45° or a −45° phase-shifted signal derived from the input signal.

DESCRIPTION OF THE PREFERRED EMBODIMENT

Figure 1:
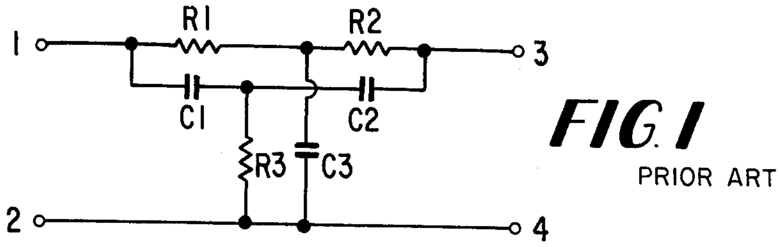
FIG. 1 PRIOR ART
FIG. 1 is a schematic diagram of a typical parallel-T circuit bridge.

In the circuit as shown in FIG. 1, the fundamental frequency component of the output signal between points 3 and 4 is substantially zero when the parallel-T circuit bridge is adjusted to null the fundamental frequency component of the input signal between points 1 and 2. It is obvious that a substantially zero common-mode signal is presented to the next stage. This filter circuit also has substantially zero loss for the harmonics of the input signal. The above-mentioned advantages illustrate the preference for the parallel-T filter circuit when making low distortion measurement. It has been difficult to use the parallel-T filter circuit to achieve self-balancing in the prior art since there is interaction between the six components of the circuit. By using the present invention, it now becomes simple to achieve a self-balancing parallel-T circuit.

FIG. 1 shows a traditional parallel-T circuit which is constructed by paralleling two t-type circuits, one contains resistors $R_1$ and $R_2$ and capacitor $C_3$, and the second contains capacitors $C_1$ and $C_2$ and resistor $R_3$.

Figure 2:
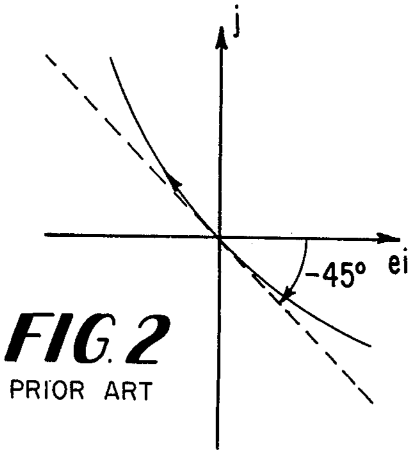
FIG. 2 PRIOR ART
FIG. 2 illustrates the vector locus of the output signal of the circuit shown in FIG. 1 with the zero phase axis being the input signal as the capacitor $C_3$ is adjusted.
Figure 3:
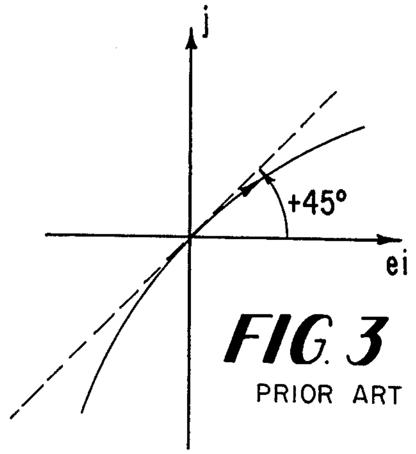
FIG. 3 PRIOR ART
FIG. 3 illustrates the vector locus of the output signal of the circuit shown in FIG. 1 with the zero phase axis being the input signal as the resistor $R_3$ is adjusted.

FIGS. 2 and 3 show vector loci of the output voltage of the network where the horizontal positive zero phase axis represents the input voltage, $e_i$. The transfer function $(e_o/e_i)$ of the circuit in FIG. 1 is represented by the following expression:

$$\frac{e_o}{e_i} = \frac{P + jQ}{A + jB} \qquad (1)$$

where $e_i$ is the input voltage $e_o$ is the output voltage $P$ is the expression $$R_3 \left\{ R_1 \cdot R_2 - \frac{C_1 + C_2}{\omega^2 C_1 C_2 C_3} \right\}$$

$Q$ is the expression $$\frac{1}{\omega C_3} \left\{ \frac{1}{\omega^2 C_1 C_2} - R_3 (R_1 + R_2) \right\}$$

$\omega$ is the radian frequency $R_1$, $R_2$, $R_3$ are the resistance values of the resistors $R_1$, $R_2$, $R_3$ $C_1$, $C_2$, $C_3$ are the capacitance values of capacitors $C_1$, $C_2$, $C_3$.

The condition to achieve a null at the fundamental frequency, $f$, is, $$e_o/e_i = 0$$

that is, $$P = Q = 0.$$

Thus, obtaining the following formulas $$C_3 = \frac{C_1 + C_2}{\omega^2 C_1 \cdot C_2} \cdot \frac{1}{R_1 \cdot R_2} \qquad (2)$$

from $P = 0$, and $$R_3 = \frac{1}{\omega^2 C_1 \cdot C_2} \quad \frac{1}{R_1 + R_2} \qquad (3)$$

from $Q = 0$. It is obvious that equation (2) is independent of $R_3$ and that equation (3) is independent of $C_3$. Therefore P and Q can be zeroed independently by varying $C_3$ and $R_3$ respectively. When $$R_1 = R_2 = R_3/2 = R$$
$$C_1 = C_2 = 2C_3 = C$$

the transfer function $e_o/e_i$ becomes zero when $\omega = 1/CR$. Equation (4) [below] is derived from equation (1) by evaluating the transfer function $e_o/e_i$ in the neighborhood of $\omega = 1/CR$.

$$\frac{e_o}{e_i} = K \cdot \frac{(R_3) \quad \left(\frac{C_1+C_2}{\omega^2 C_1 \cdot C_2} \cdot \frac{1}{C_3} - R_1 \cdot R_2\right) + j \frac{1}{\omega C_3} \left\{ R_3 (R_1 + R_2) - \frac{1}{\omega^2 C_1 C_2} \right\}}{1 + j\,1} \qquad (4)$$

where $K$ is a constant.

The vector locus of the output voltage when $C_3$ is varied can be examined when the Q term is zeroed by adjusting $R_3$. If the term $C_3$ is replaced by $C_3 \pm \Delta$, equation (4) becomes $$\frac{e_o}{e_i} = K' \cdot \frac{\left(\frac{C_1 + C_2}{\omega^2 C_1 \cdot C_2} \cdot \frac{1}{C_3 \pm \Delta} - R_1 \cdot R_2\right)}{1 + j\,1} = \tfrac{1}{2} K' \quad \left(\frac{C_1 + C_2}{\omega^2 C_1 C_2} \cdot \frac{1}{C_3 \pm \Delta} - R_1 R_2\right) (1\ j1)$$

where $K'$ is the product of $K$ and $R_3$.

Therefore, if $C_3$ is changed to $C_3 - \Delta$ then the vector locus of the output voltage moves in the direction of −45° to the input voltage, $e_i$, and if $C_3$ is changed to $C_3 + \Delta$ then the locus moves in the direction of −225° to the input voltage. FIG. 2 shows this relationship and the tangent at $\omega = 1/CR$ is shown as the dotted line which is −45°, or −225°, from the input voltage.

Similarly, FIG. 3 shows the vector locus of the output voltage when $R_3$ is varied when P is zeroed by adjusting $C_3$. In this case the tangent of the vector locus at $\omega = 1/CR$ follows the dotted line which is +45°, or +225°, from the input voltage.

These two vector loci components of the output voltage can be moved independently of each other by changing $R_3$ and $C_3$ when the output voltage is substantially zero. $R_3$ and $C_3$ control the +45° and −45° vector locus components of the output signal when compared to the input signal, respectively. Since the ±45° vector loci are orthogonal to each other, a parallel-T circuit can be tuned to an input signal frequency at which the output voltage of the circuit becomes substantially zero.

Figure 5:
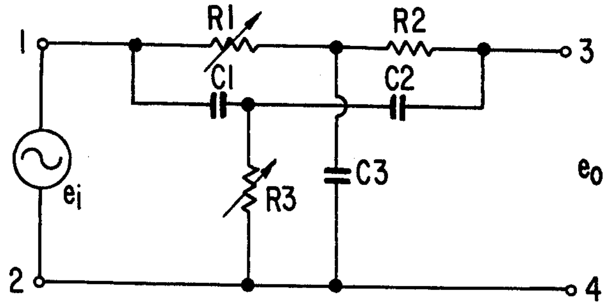
FIG. 5 PRIOR ART
FIG. 5 is a schematic diagram of the parallel-T circuit bridge utilized by the prior art.

A parallel-T circuit can be manually balanced by varying $R_3$ and $C_3$. FIG. 5 is an example of the parallel-T circuit configuration that is commonly used when the circuit is manually balanced. If an input voltage, $e_i$, with a frequency $f_0$ is applied between the terminals 1 and 2, then $R_1$ and $R_3$ are adjusted to achieve output voltage between the terminals 3 and 4 that is substantially zero at $f_0$. To achieve final balancing, $R_1$ and $R_3$ must be adjusted alternately since they interact with each other and thus require many adjustments and readjustments to achieve a balanced circuit. This complex and time-consuming operation is clearly a disadvantage when attempting to balance, or null, the circuit at the desired frequency.

Figure 6:
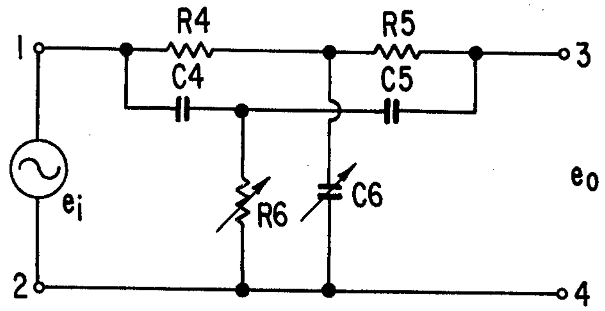
FIG. 6 is a schematic diagram of the parallel-T circuit bridge according to the preferred embodiment of the present invention.

By using the circuit shown in FIG. 6, very few adjustments are necessary to achieve final balancing, since variable components $R_6$ and $C_6$ can be adjusted independently, without interaction, in the neighborhood of balancing point.

Figure 4:
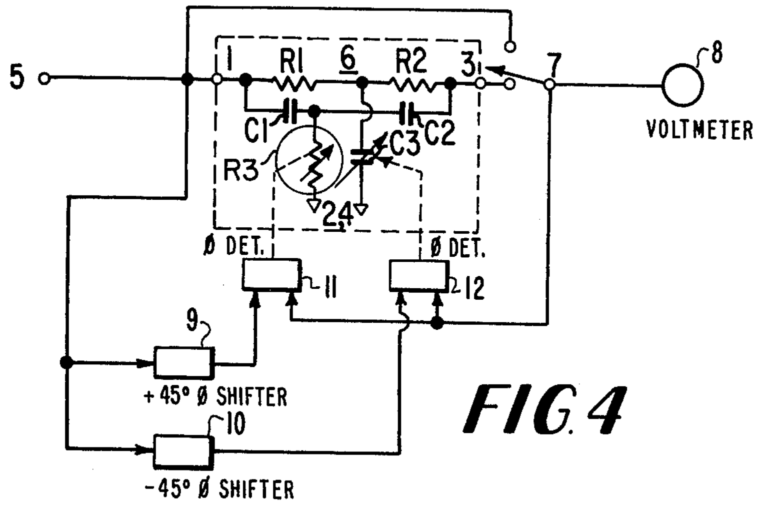
FIG. 4 is a schematic and block diagram of the preferred embodiment of the Distortion Analyzer.

FIG. 4 shows an embodiment of the invention that uses the circuit of FIG. 6. Input terminal 5 is connected to the input terminal 1 of parallel-T circuit 6. Capacitor $C_3$ and resistor $R_3$ in circuit 6 are variable and they are controlled by synchronous phase detectors 12 and 11 respectively. Input terminal 5 is also connected to phase shifters 9 and 10. Circuit 9 is a +45° phase shifter and circuit 10 is a −45° phase shifter. Outputs of phase shifters 9 and 10 are connected to synchronous phase detectors 11 and 12 respectively. Switch 7 selectively connects the voltmeter 8 to output 3 or input 1 of the parallel-T circuit 6. The common terminal of switch 7 is also connected to the second input of both of the synchronous phase detectors 11 and 12. The outputs of synchronous phase detectors 11 and 12 control $R_3$ and $C_3$ of the parallel-T circuit 6 respectively.

As aforementioned, the vector locus of parallel-T circuit 6 moves in the +45° direction in the neighborhood of the balancing point as $R_3$ is adjusted. Thus, output 3 of the parallel-T circuit 6 is used to control synchronous phase detector 11 to automatically control the value of $R_3$. Similarly, output 3 of the circuit 6 is also used to control synchronous phase detector 12 to automatically control the value of $C_3$.

Another embodiment of the present invention does not require phase shifters 9 and 10. In this embodiment, the +45° phase shifted input signal is obtained from the common point between capacitors $C_1$ and $C_2$, and the −45° phase shifted input signal is obtained from the common point between resistors $R_1$ and $R_2$. Thus, the phase shifted signal input of the synchronous phase detectors 11 and 12 must be connected to the +45° and the −45° phase shifted input signal points respectively.

By using the invention as shown in FIG. 4, or as modified in the last preceding paragraph with respect to the +45° and the −45° phase shifted input signals, the fundamental frequency component of the input signal is rejected at output 3 of circuit 6 and only harmonics of the input signal will be present at output 3. Therefore the distortion factor of the input signal can be measured by following procedure. First, the input signal level is set to some desired level by connecting switch 7 to input 5 and monitoring voltmeter 8, then the output 3 of parallel-T circuit 6 is measured by voltmeter 8 after connecting switch 7 to the output terminal 3 of circuit 6. The distortion factor can be calculated utilizing the two measured values obtained as described above.

It is obvious that an active parallel-T circuit could be used instead of a passive one as in this invention with the same advantages as previously discussed. Also, in circuit 6 of FIG. 4, $R_3$ is typically a photosensitive resistor, and $C_3$ is typically a variable capacitance diode or an active capacitance circuit with variable gain.

We claim:

1. An automatic distortion analyzer circuit comprising:

a parallel-T circuit including:

a first T circuit including two fixed resistors and a variable capacitor;

a second T circuit including two fixed capacitors and a variable resistor;

said variable capacitor being variable in response to a first error signal applied thereto; and said variable resistor being variable in response to a second error signal applied thereto;

a first phase shifter connected to the input of said parallel-T circuit bridge for producing a negative phase shift of the input signal;

a second phase shifter connected to the input of said parallel-T circuit bridge for producing a positive phase shift of the input signal;

a first synchronous phase detector connected to receive the output signal of said first phase shifter and the output signal of said parallel-T circuit for producing a first error signal;

a second synchronous phase detector connected to receive the output signal of said second phase shifter and the output signal of said parallel-T circuit for producing a second error signal;

means for varying the impedance of said variable capacitor in response to said first error signal; and means for varying the impedance of said variable resistor in response to said second error signal.

2. The automatic distortion analyzer as in claim 1 wherein said first phase shifter produces a phase shift of the input signal of substantially $-45° \pm n \cdot 360°$, where $n$ is a positive integer or 0.

3. The automatic distortion analyzer as in claim 1 wherein said second phase shifter produces a phase shift of the input signal of substantially $+45° \pm n \cdot 360°$, where $n$ is a positive integer or 0.

4. The automatic distortion analyzer as in claim 1 wherein said variable resistor is a photosensitive resistor.

5. The automatic distortion analyzer as in claim 1 wherein said variable capacitor is a variable capacitance diode.

6. The automatic distortion analyzer circuit as in claim 1 wherein said variable capacitor is an active capacitance circuit with variable gain.

7. An automatic distortion analyzer circuit comprising:

a parallel-T circuit including:

a first T circuit including two fixed resistors and a variable capacitor;

a second T circuit including two fixed capacitors and a variable resistor;

said variable capacitor being variable in response to a first error signal applied thereto; and said variable resistor being variable in response to a second error signal applied thereto;

a first synchronous phase detector responsive to a signal at the common junction between the two fixed capacitors of said second T circuit and the output signal of said parallel-T circuit for producing a first error signal;

a second synchronous phase detector responsive to a signal at the common junction between the two fixed resistors of said first T circuit and the output signal of said parallel-T circuit for producing a second error signal;

means for varying the impedance of said variable capacitor in response to said first error signal; and means for varying the impedance of said variable resistor in response to said second error signal.

8. The automatic distortion analyzer circuit as in claim 7 wherein said variable resistor is a photosensitive resistor.

9. The automatic distortion analyzer circuit as in claim 7 wherein said variable capacitor is a variable capacitance diode.

10. The automatic distortion analyzer circuit as in claim 7 wherein said variable capacitor is an active capacitance circuit with variable gain.

* * * * *

UNITED STATES PATENT AND TRADEMARK OFFICE

CERTIFICATE OF CORRECTION

PATENT NO. : 3,916,296

DATED : October 28, 1975

INVENTOR(S) : Yoh Narimatsu and Shiro Kito

It is certified that error appears in the above-identified patent and that said Letters Patent are hereby corrected as shown below:

Column 2, Equation (3) should read --

$$R_3 = \frac{1}{\omega^2 C_1 \cdot C_2} \cdot \frac{1}{R_1 + R_2}$$ --;

Column 3, between lines 21 and 29, that portion of the equation reading "(1 jl)" should read --(1-jl) --.

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*